United States Patent
Grabendorfer et al.

[11] 3,820,387
[45] June 28, 1974

[54] PROBE SYSTEM FOR ULTRASONIC NONDESTRUCTIVE TESTING

[75] Inventors: Werner Grabendorfer, Bensberg-Refrath; Manfred Gregor, Rondorf near Cologne; Udo Schlengermann, Hurth-Hermulheim, all of Germany

[73] Assignee: Krautkramer-Branson Incorporated, Stamford, Conn.

[22] Filed: Apr. 11, 1973

[21] Appl. No.: 350,167

[30] Foreign Application Priority Data
Apr. 12, 1972 Germany............................ 2217528

[52] U.S. Cl. ................................................. 73/67.9
[51] Int. Cl. ........................................ G01n 29/00
[58] Field of Search ......... 73/67.5, 67.7, 67.8, 67.9, 73/71.50, 67.5 R, 67.8 R, 67.8 S, 71.5 U

[56] References Cited
UNITED STATES PATENTS
3,575,044   4/1971   Gibbs.................................. 73/67.9

*Primary Examiner*—Richard C. Queisser
*Assistant Examiner*—Stephen A. Kreitman
*Attorney, Agent, or Firm*—Ervin B. Steinberg

[57] ABSTRACT

A pulse-echo ultrasonic test system comprises an array of probes disposed along the surface of a test specimen. The array is divided into groups, each group comprising a plurality of probes. A control circuit sequentially renders each group of probes operative in a predetermined sequence to cover the exposed length of the specimen. Certain adjacent probes are rendered operative during the time interval in which two adjacent but different groups are rendered operative to provide an overlap, while other probes are rendered operative only once during a complete cycle in which all of the groups are rendered operative.

7 Claims, 5 Drawing Figures

PROBE SYSTEM FOR ULTRASONIC NONDESTRUCTIVE TESTING

BACKGROUND OF THE INVENTION

This invention relates to ultrasonic nondestructive testing and more specifically concerns a system of probes coupled to a control circuit for testing large specimens or workpiece areas using a quantity of probes energized at different time intervals.

The system described hereafter has at its principal object an arrangement for effecting a fast and possibly a one hundred per cent ultrasonic scanning of the cross-section of specimens. A complete test requires that the test zones into which a large specimen is divided be located very close to one another. As determined by the structure of the sound field, the test zones in the specimen must be very small and this generally interferes with high speed testing of specimens.

It is known, that when testing is carried out using ultrasonic energy in conjunction with automated means, probes or systems of probes are employed which scan the sound field generated along the surface of the test specimen. The size of the test zone covered is dependent largely upon the structure of the sound beam radiated along the scanning plane.

In order to increase the rate of testing (volumewise) the following methods are known:

Increasing the pulse repetition frequency and the relative scanning rate. In this manner it is possible, with increased scanning efficiency, to maintain the quantity of impulses per area constant, i.e. the scanning requirements, as well as the test results, remain equally satisfactory.

Another approach is to increase the probe size when single probe operation is used. Assuming that the relative speed between the probe and the test specimen is maintained constant, the scanned volume will be increased since the test zone during each scan has been widened.

The use of multiple probe systems also is well known. A typical system comprises an arrangement in which a number of probes are mounted in juxtaposition. If, in such a system, the probes are rendered operative singly and in sequence, it is necessary to accept the large gaps which occur between each probe. It is, therefore, not possible to carry out a one hundred per cent inspection of the workpiece cross section. A further disadvantage resides in the fact that with the parallel operation of such a system, the same inherent shortcomings at those with a large crystal prevail. The increase of the test zone, as already described, means a change in the radiated sound field. A difference must be established between two ranges of the sound field namely, the far field and the near field. Extending the sound beam into the far field is linked to either a reduction in the size of the acoustic probe or a lowering of the test frequency — neither of which is desirable as the available energy decreases with a reduction in the probe diameter and, consonant with a lowered frequency, the ability to detect flaws is diminished also.

Widening of the sound beam in the near field is linked to an increase in the size of the probe. A serious disadvantage resides, however, in the fact that the uneven sound pressure distribution within the test zone may cause flaws not being detected when testing is performed by automated means. In addition, the sensitivity of the system to detect small flaws diminishes as the diameter of the probe increases. Moreover, the ability to locate a defect or a flaw becomes increasingly reduced as the probe diameter increases.

An increase of the pulse repetition frequency and of the testing speed has the disadvantage that the upper limit of the pulse repetition frequency becomes restricted. In many instances, it is possible, therefore, to increase the relative speed between the probe and the test specimen to the desired level as there arise operational difficulties, or difficulties involving acoustic coupling between the probe and specimen.

It is an object of this invention to overcome the heretofore described limitations and achieve a substantial increase in the test efficiency without requiring an increase of the relative speed between the probe and the test specimen.

SUMMARY OF THE INVENTION

The present invention realizes the stated object by providing an array comprising a plurality of probes, the probes being arranged in rows or fields, and means for causing groups of at least two probes to be energized simultaneously. Cyclic switching means operate the probe groups in such a manner that, during a specific number of cycles, e.g. three switching cycles, some of the probes among the probe system are energized to operate once as either a transmitter or receiver of ultrasonic energy, while other probes are energized more than once. This action provides a very wide sound pressure distribution which spreads over an extended scanning zone. Hence, the probe diameters can be kept small so as to avoid the disadvantages noted above.

DETAILED DESCRIPTION OF THE INVENTION

Figure 1:
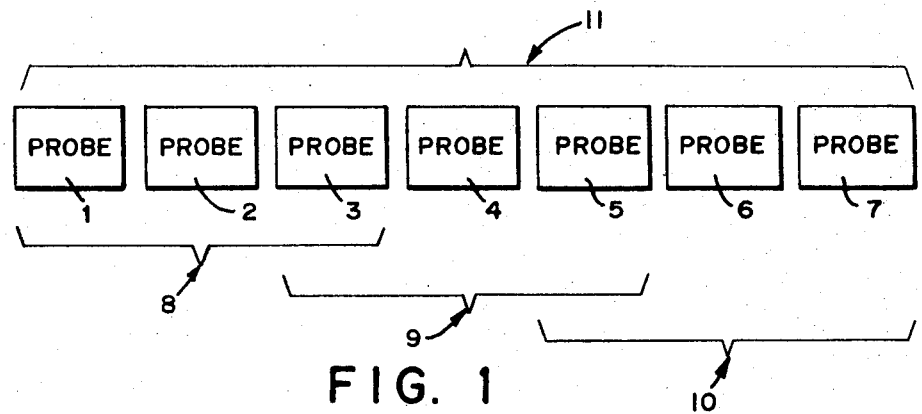
FIG. 1 is a schematic illustration of the probes arranged in a row.

Referring now to the figures, a plurality of ultrasonic probes 1 to 7, also known as crystals, preferably of rectangular configuration, are disposed to form an array, preferably a linear array 11 as seen in FIG. 1. Smaller individual groups of probes forming this array are rendered operative in sequence, for example, during each sequence a group of three probes is energized by being selected from among the array of probes. The groups so selected are energized in sequence to produce what may be termed a "sliding test zone." In this manner, a uniform coverage of a wide test zone corresponding to the length of the entire array is obtained. The sliding scanning zone, typically, can be carried out in the following manner:

With each initial pulse of the ultrasonic instrument a group of three juxtaposed probes is energized. The group of probes rendered operative is followed by sequential operation of two further groups of probes, for example, the sequence of operation being probes 1, 2 and 3; 3, 4 and 5; and 5, 6 and 7. By means of this sequence, a complete overlapping of the scanned zones, in this example three zones, is achieved extending across the entire length of the probe system. Hence, the entire length of the probe system can be considered to be the scanning zone, notwithstanding the fact that only a group of three small probes is operative during any time segment. The system of scanning, according to the invention, provides for the scanning of very large test zones, almost simultaneously, without the occurrence of gaps. The described method preserves the advantages inherent in smaller scanning zones, namely the greater ability to detect small defects, particularly determining flaw size and locating flaw position with a high degree of accuracy.

FIG. 1 shows a linear array 11 of seven probes, the probes being disposed in close proximity to one another. The probes 1, 2 and 3 belong to group 8, probes 3, 4 and 5 to group 9, and probes 5, 6 and 7 to group 10.

Figure 2:
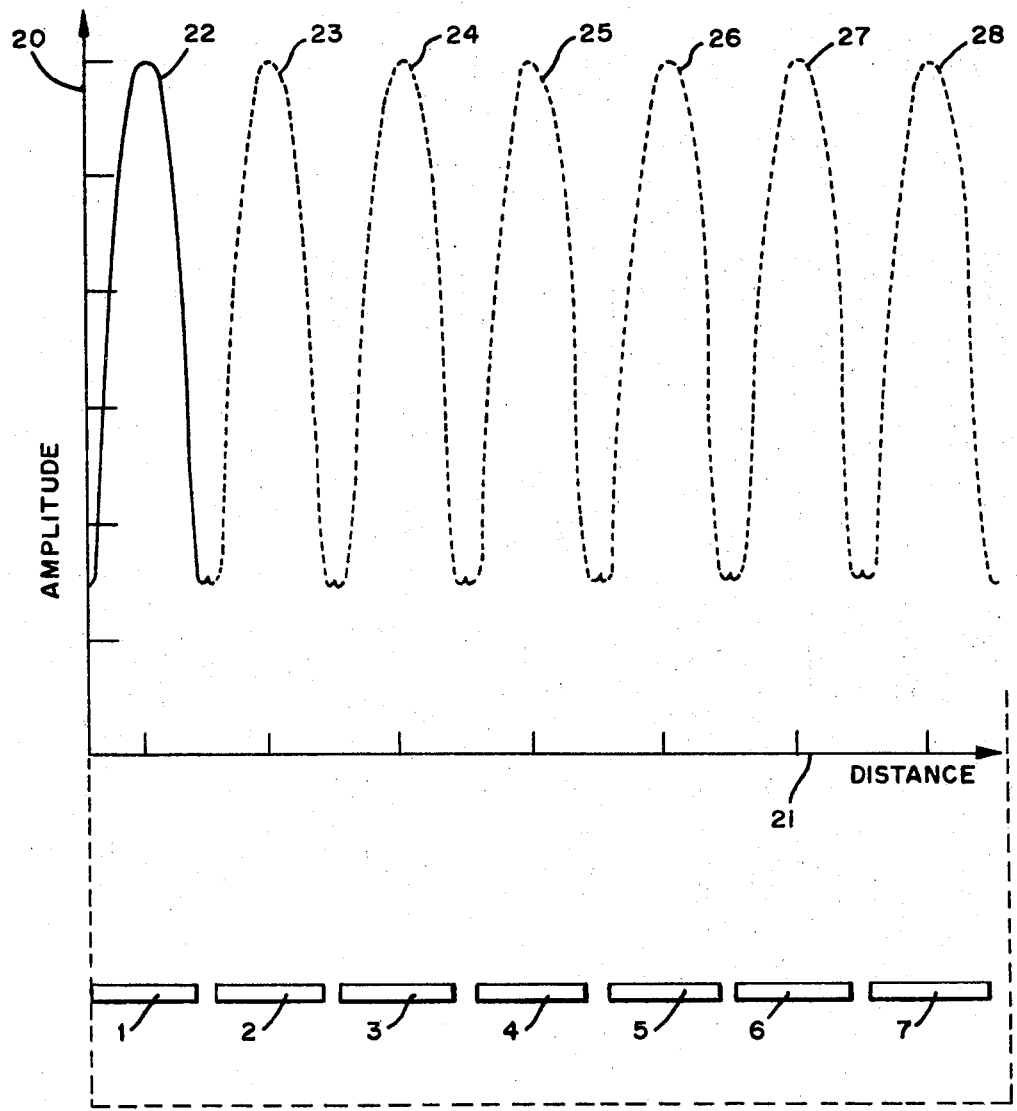
FIG. 2 is a diagram indicating the sound pressure distribution at fixed distances when all probes are energized in sequence.

The seven probes are shown once again in FIG. 2. The sound pressure distribution is depicted in a cartesian coordinate system. The position of the probes is shown along the horizontal distance axis 21 and the pressure amplitude is shown along the vertical axis 20. The sound pressure curve 22 applies to probe 1, the sound pressure curve 23 to probe 2, and so forth. The probes are energized in sequence as described.

Figure 3:
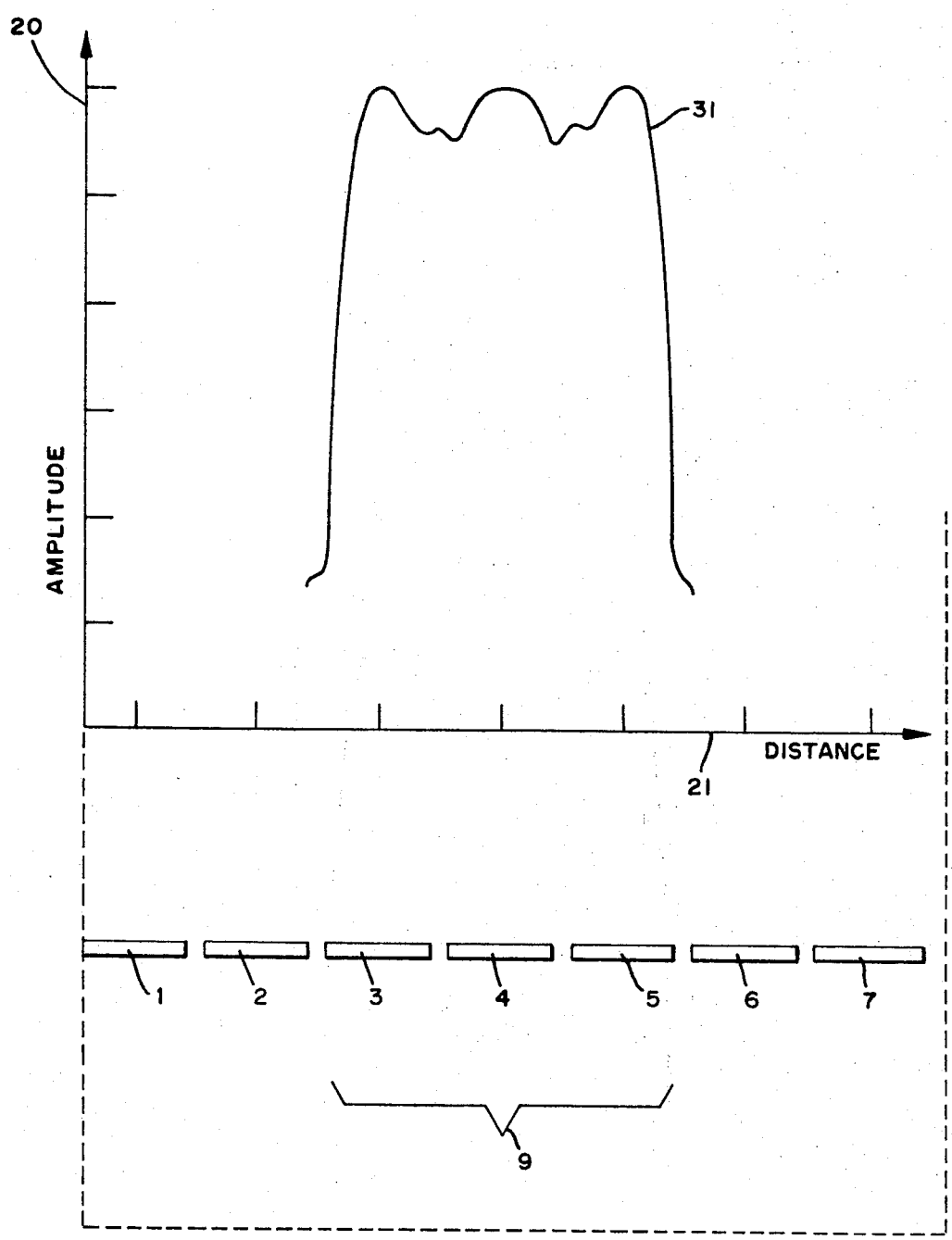
FIG. 3 is a diagram indicating the sound pressure distribution when individual groups of probes of the array are energized.

In FIG. 3 the position of the probes is shown again along axis 21. In the example per FIG. 3, the sound pressure distribution curve 31 formed by probes 3, 4 and 5 is illustrated over the position of group 9 comprising these three probes. It is known that at the edge of the group of probes the sound pressure distribution drops sharply, whereas, the pressure distribution in front of the probes as seen in the direction of abscissa 21 remains fairly constant.

Figure 4:
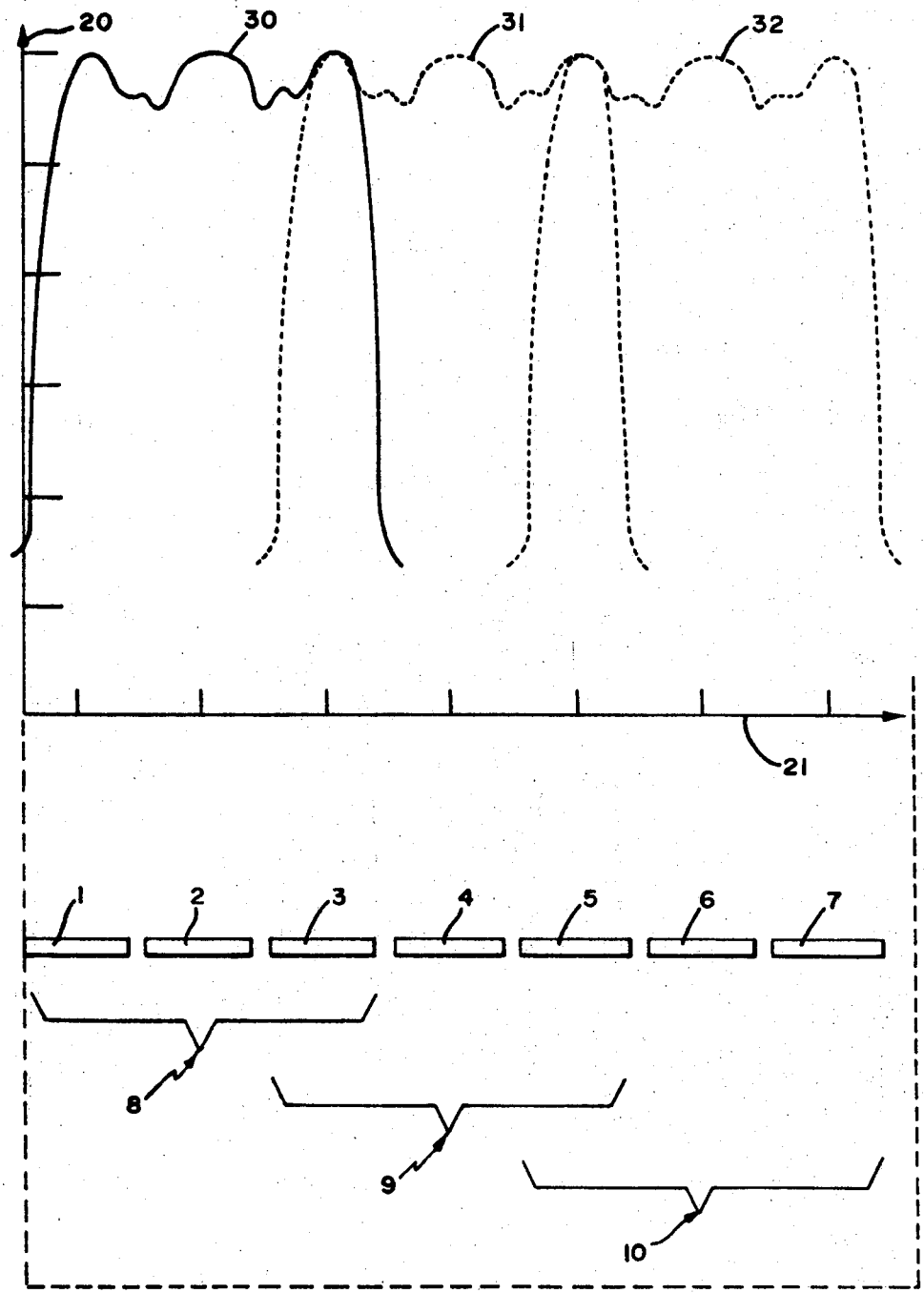
FIG. 4 is a diagram indicating the sound pressure distribution of three groups of probes.

FIG. 4 shows the sound pressure distribution curve when groups 8, 9 and 10 are energized. The sound pressure distribution curve 30 applies to group 8, comprising probes 1, 2 and 3. The sound pressure distribution curve 31 applies to group 9 comprising probes 3, 4 and 5, shown in FIG. 4 as a dotted line. It can be seen that the distribution curves 30 and 31 overlap. A defect in the workpiece opposite probe 3 will be sensed when either the group 8 or the group 9 is energized. Such an occurrence is indicative of the fact that the defect is disposed opposite probe 3.

Using the phenomenon and a suitable logic circuit, it is readily possible to determine and indicate the location and amplitude of a flaw. In addition, the sound pressure distribution curves 31 and 32 also overlap. Curve 32 is represented by a dashed line. Curve 32 is obtained by energizing group 10, comprising probes 5, 6 and 7. It is apparent that the foregoing arrangement is well suited for determining the location of a flaw.

Figure 5:
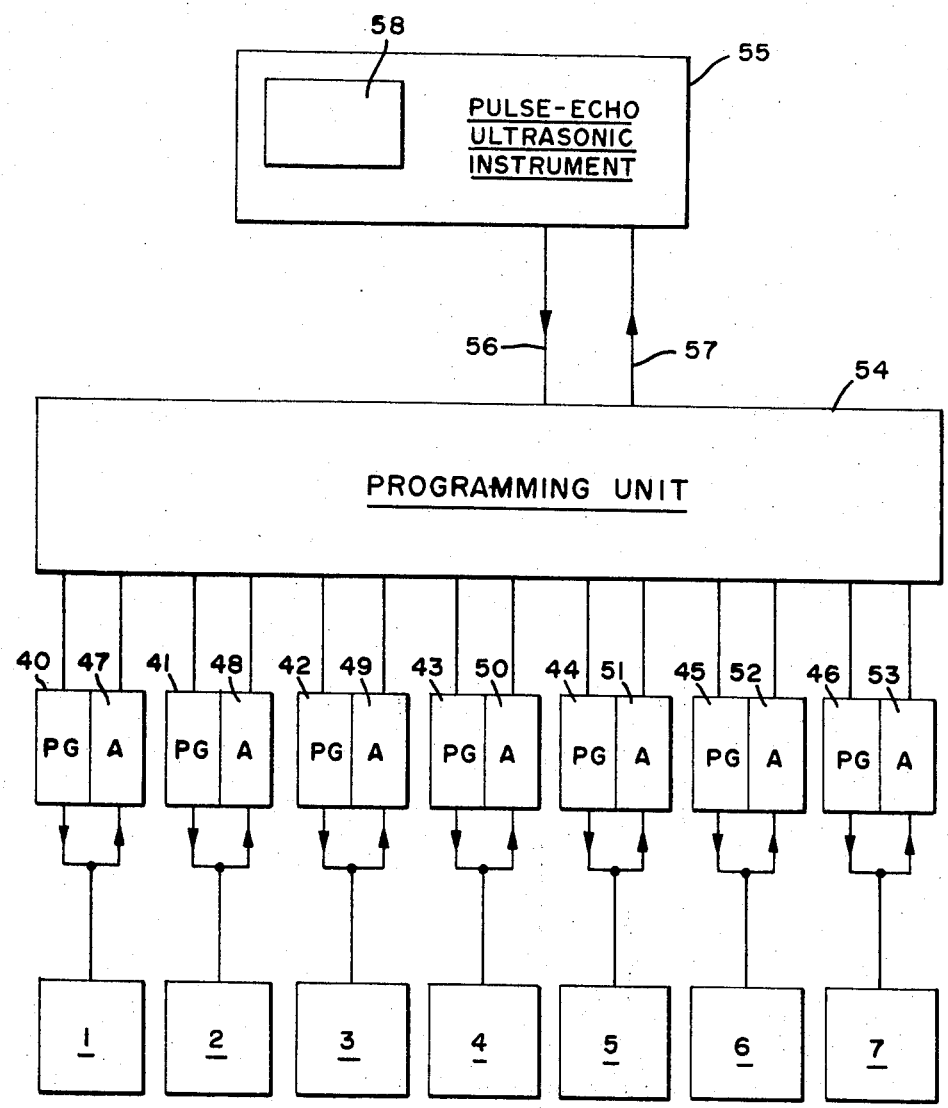
FIG. 5 is a schematic block diagram for explaining the operation of the present invention.

FIG. 5 provides the schematic block diagram of the control circuit for sequencing the energization of the seven ultrasonic probes in accordance with the description hereinabove.

A programming circuit is represented by block 54. A driving pulse is fed to the test programming circuit unit 54 from an ultrasonic pulse-echo instrument 55 by way of the conductor 56. The sequence of the switching the probes is programmed in the programming circuit unit 54. The pulse generators 40, 41 and 42 are operated simultaneously by the programming unit. These pulse generators 40, 41 and 42 energize the probes 1, 2 and 3 so as to cause them to transmit sound waves into the specimen disposed in front thereof. If a defect lies in the path of the radiated sound energy, a part of the reflected energy returns from the specimen to the test probes 1, 2 and 3. The received sound energy (echo) is converted into electrical pulses and amplified by preamplifiers 47, 48 and 49. The test programming unit 54 is conditioned so that the sound energy received from the amplifiers 47, 48 and 49 passes to the receiving path 57 and is transmitted to the ultrasonic instrument 55. There, the returned signal can be either indicated on a cathode ray tube screen 58 or can be processed by known electronic logic circuits. After this sequence, the pulse generators 42, 43 and 44 are energized by the programming unit 54 and thereby probes 3, 4 and 5 become rendered operative. These probes now transmit a sound pulse which is processed as described earlier. A portion of a sound wave received from a defect reaches the ultrasonic instrument 55 via respective preamplifiers 49, 50 and 51 and is processed further for evaluation.

Pulse generators 44, 45 and 46 are energized during the next cycle and, hence, probes 5, 6 and 7 are activated to transmit the ultrasonic signal into the specimen. After processing the signals generated by probes 5, 6 and 7, the pulse generators 40, 41 and 42 are reenergized and a new test cycle commences.

FIG. 5 shows schematically an example of a so-called sliding test zone circuit. The scanning zone in front of the scanning group, comprising probes 1, 2 and 3, moves during the next cycle in front of that group of probes comprising the probes 3, 4 and 5, and finally moves before that group comprising probes 5, 6 and 7.

The present invention is not restricted to the embodiment shown heretofore. Several rows of probes may be arranged in parallel, one behind the other, and, depending upon the type of test, energize groups in rows or fields as already described in order to quickly scan larger specimens. It is also possible to solve the problem by energizing a probe matrix arranged either in rows, columns, or diagonally in accordance with the foregoing description. Further, for special tests, it is possible to separate transmitting and receiving groups, so that, for example one row contains the transmitting group of probes while the receiving group of probes is mounted in a following row.

What is claimed is:

1. A probe system for ultrasonic nondestructive testing by the pulse-echo test method comprising:
a plurality of probes disposed in a linear array on the surface of a specimen to be tested, each probe adapted to transmit ultrasonic pulse energy into the specimen and to subsequently receive an echo signal therefrom, such echo signal being indicative of an acoustic discontinuity intercepted by the energy transmitted from a respective probe;
control means coupled to said probes for energizing during a first time interval simultaneously a first group of juxtaposed probes, such group comprising a portion of said plurality, and for energizing during a subsequent second time interval simultaneously a second but similar group of juxtaposed probes whereby one of said probes is common to said first group and to said second group to provide overlapping test zones and, means coupled to said probes and operative responsive to the energizing of said probes for indicating acoustic discontinuities in the workpiece.

2. A probe system as set forth in claim 1, each group comprising at least three probes causing one probe to be energized during said first and during said second interval and causing at least one probe of each group to be energized only once during said intervals.

3. A probe system as set forth in claim 1, each of said groups having an equal quantity of probes.

4. A probe system as set forth in claim 1, said plurality of probes being divided into at least three groups, the thrid group of probes being energized during a subsequent third time interval, and one of said probes is common to said second and said third group.

5. A probe system as set forth in claim 1 and including a plurality of pulse generating means, one coupled to each respective probe.

6. The method of testing a workpiece by the pulse-echo ultrasonic test method comprising the steps:
disposing a plurality of juxtaposed ultrasonic probes forming an array in ultrasonic energy transmitting contact with the surface of the workpiece,
rendering operative for transmitting and receiving ultrasonic signals sequentially a respective group of juxtaposed probes selected from said plurality, the probes belonging to a respective group being rendered operative substantially simultaneously, and
controlling the operation of said groups to cause during one entire cycle of operation in which all of the respective groups are rendered operative in sequence a progressively advancing overlapping sound pressure pattern across the surface portion of the workpiece opposite said array.

7. The method as set forth in claim 6, said sequencing being arranged to cause said overlapping pattern to be the result of rendering operative twice during said one cycle the probe disposed at the end position of a respective group and juxtaposed with the probe belonging to a group of probes rendered operative subsequently.

* * * * *